(12) United States Patent
DeFazio

(10) Patent No.: US 6,588,395 B2
(45) Date of Patent: Jul. 8, 2003

(54) ROTARY INTERNAL COMBUSTION ENGINE—DESIGNED FOR FUTURE ADIABATIC OPERATION

(76) Inventor: Robert DeFazio, 5867 Sara Key Dr., Richmond, VA (US) 23227

( * ) Notice: Subject to any disclaimer, the term of this patent is extended or adjusted under 35 U.S.C. 154(b) by 0 days.

(21) Appl. No.: 10/139,297

(22) Filed: May 6, 2002

(65) Prior Publication Data

US 2002/0166535 A1 Nov. 14, 2002

Related U.S. Application Data

(60) Provisional application No. 60/289,382, filed on May 8, 2001.

(51) Int. Cl.[7] ............................................... F02B 53/04
(52) U.S. Cl. ........................ 123/224; 123/223; 123/221
(58) Field of Search ................................ 123/221, 223, 123/224, 225

(56) References Cited

U.S. PATENT DOCUMENTS

| | | | |
|---|---|---|---|
| 760,631 A | 5/1904 | Jewell | |
| 822,952 A | 6/1906 | Jewell | |
| 3,012,551 A | 12/1961 | Renshaw | |
| 3,232,041 A | 2/1966 | Renshaw | |
| 3,464,395 A | 9/1969 | Kelly | |
| 3,841,276 A | * 10/1974 | Case | ............ 123/221 |
| 4,202,315 A | 5/1980 | Lutrat | |
| 4,617,886 A | * 10/1986 | Mach | ............ 123/223 |
| 4,688,531 A | * 8/1987 | Aase | ............ 123/227 |
| 5,293,849 A | * 3/1994 | Huckert | ............ 123/221 |
| 5,797,366 A | 8/1998 | Adamovski | |

* cited by examiner

Primary Examiner—Hoang Nguyen

(57) ABSTRACT

The engine includes a housing having a circular cavity with a rotatable flywheel defining a radially extending power piston(s) disposed therein. An abutment disc connects to a compression piston rotor and rotates synchronously with the flywheel. Compression piston(s) rotate on separate axes within the compression piston rotor and move in and out with respect to the outer periphery of the compression piston rotor. A compression piston stator seals off the top of the compression piston rotor causing the compression pistons to compress a charge of gas to be delivered on top of the power piston(s). Fuel is injected and the combustion zone is ignited. The expanding gases force the power piston(s) and flywheel around the housing producing work. The previous products of combustion are forced out the exhaust system in front of the power piston.

18 Claims, 13 Drawing Sheets

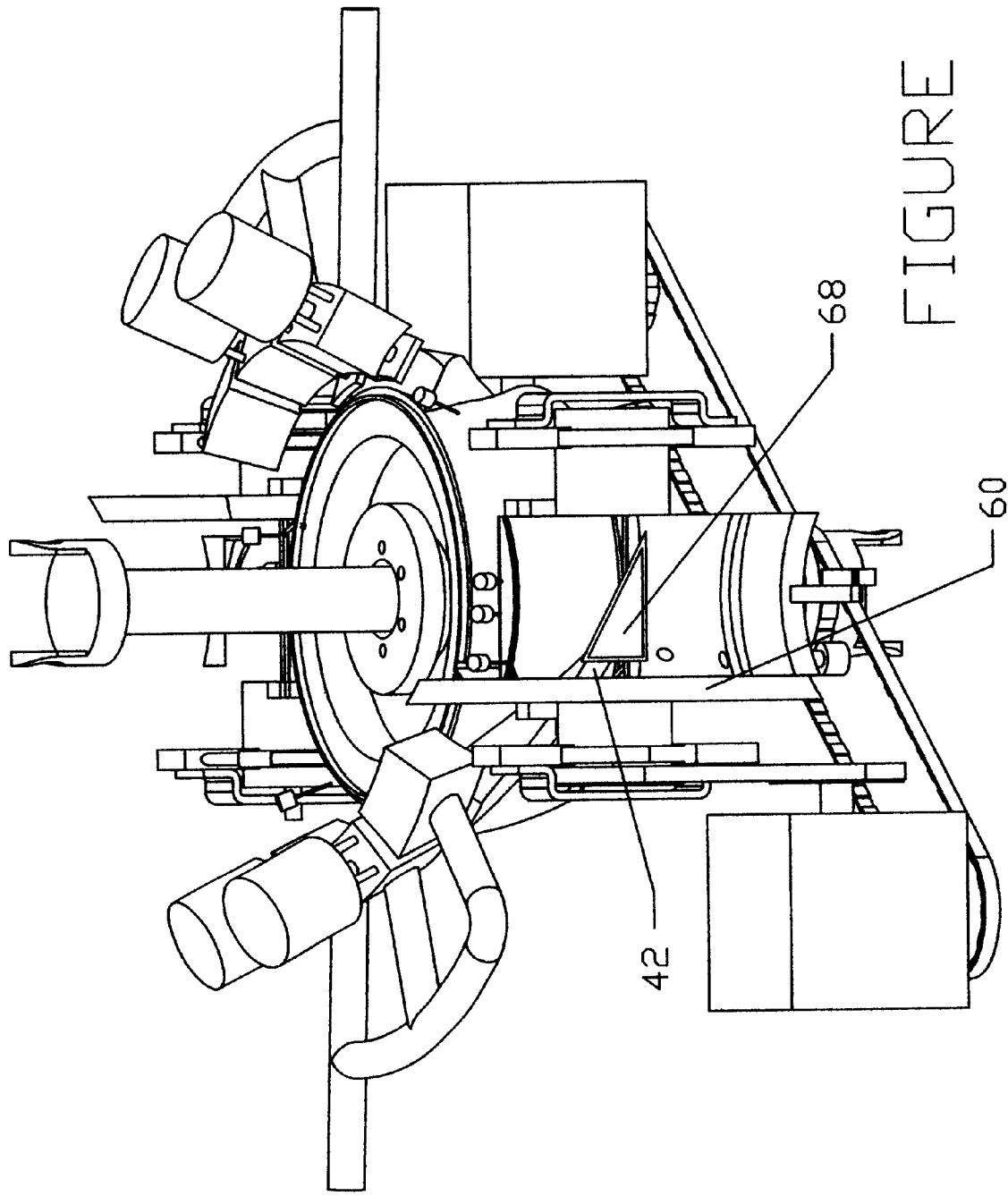

ROTARY INTERNAL COMBUSTION ENGINE— DESIGNED FOR FUTURE ADIABATIC OPERATION

This application claims the benefit of Provisional patent application Serial No. 60/289,382, filed May 8, 2001.

BACKGROUND OF THE INVENTION

1. Field of the Invention

This invention relates to rotary engines including those with adiabatic operation capability.

2. Description of Related Art

Prior Art falls into two categories: Reciprocating Engines and Rotary Engines.

1. Reciprocating Engines are limited in a number of ways:
    a. The torque output is low due to the crankshaft arrangement.
    b. The crankshaft usually fixes the compression ratio.
    c. The compression stroke usually equals the expansion stroke.
    d. If the engine is not cooled externally (as in an Adiabatic Engine) the very hot piston and combustion chamber repels the air intake action.
    e. The intake and exhaust valves volumetrically limit the piston speed.
    f. The reciprocating action limits the speed of the engine.
    g. There are many moving parts.
    h. The reciprocating parts are more difficult to make of ceramic material.
2. Rotary engines are limited in a number of ways:
    a. There is usually one reciprocating part, which limits the speed of the engine.
    b. There is usually a balancing problem.
    c. The combustible mixture is usually not injected directly into the compression chamber. The compressed gas is usually routed to the combustion chamber with an associated loss in entropy. In other words, their compression was not adiabatic but allowed opportunities to lose heat in the process.
    d. Sealing has been a problem

BRIEF SUMMARY OF THE INVENTION

This invention was designed initially to be used as an adiabatic (no external cooling) engine. The complete rotary design facilitates making the components of ceramic materials. This way the engine can run as hot as necessary (over 2000 deg F.) being cooled only by the intake and exhaust gases. Ceramics can withstand high temperatures and have excellent wear characteristics and low coefficients of friction. However, the engine does not need to be made of ceramic materials and operational benefits inherent in the design will make this a useful engine with conventional cooling. The engine consists of a housing with a circular cavity in it for a power piston(s) and a flywheel to rotate. The power piston(s) extends radially from the flywheel. In one version the flywheel and power piston(s) have gear teeth that engage gear teeth in an abutment disc. The power piston appears like raised gear teeth on the flywheel. The abutment disc is connected to a compression piston rotor. The power piston(s) and flywheel turn synchronously with the abutment disc and compression piston rotor. (whether internally synchronized or externally synchronized). The compression piston rotor contains cavities to house the compression pistons. The compression pistons and compression piston rotor rotate about separate axes and the compression pistons move in and out in the rotor cavity with respect to the outside diameter of the compression piston rotor as they both rotate. A compression piston stator seals off the top of the compression piston rotor causing the compression pistons to compress a charge of gas to be delivered on top of the power piston. Delivery to the top of the power piston allows for high compressions to be achieved. The fuel can be premixed with the air or injected separately. The combustion chamber is ignited either by a spark or by high temperatures of compression and the expanding gases force the power piston around the housing producing work. The distance the power piston travels before the gas is relieved is variable so as to be able to extract all the useful work out of the expansion cycle at various power settings. The previous products of combustion are forced out the exhaust system in front of the power piston. The sealing of the compression piston and compression piston rotor is accomplished by continuously wiping the compression piston rotor with a seal and making sure the compression piston is at the same outer diameter with the compression piston rotor at the point of seal contact. Other seals can be added as necessary. At slow speeds more sealing is necessary. At higher speeds (near the speed of sound), only close tolerances are necessary to prevent excessive leaks.

It is an object of this invention to provide a totally rotary engine more conducive to construction with ceramic materials. It is an object to construct major components of this invention with ceramic materials. This allows for higher temperature operation and increased efficiency. It is an object of this invention to provide a design more conducive to the use of solid lubricants. It is an object of this invention to separate the compression apparatus from the power producing apparatus so the intake can run cooler and not inhibit the intake system. This is important in an engine that will not have an external cooling system (An Adiabatic Engine). It is an object of this invention to have a power stroke independent of the compression stroke to get more useful work out of the fuel. It is an object of this invention to have a variable compression stroke. It is an object of this invention to have a variable expansion stroke. It is an object of this invention to have an engine not volumetrically limited by valves. It is an object of this invention to have an engine with fewer moving parts. It is an object of this invention to have an engine with less internal friction. It is an object of this invention to have an engine capable of high speeds. It is an object of this invention to have a balanced engine. It is an object of this invention to have a rotary engine with a nearly adiabatic compression cycle with the injection of the compressed gases directly into the combustion chamber. It is an object of this invention to be able to seal the rotary engine adequately. It is an object of this invention to provide an engine that can be made with conventional materials, with conventional lubrication, and with conventional cooling. It is an object of this invention to provide a more powerful engine per unit weight. It is an object of this invention to provide an engine with high torque. The normal automobile transmission could be eliminated with the amount of torque available from this engine. It is an object of this invention to provide an engine with much less friction and eliminate the need for conventional lubrication of wiped surfaces Further objects and advantages of my invention will become apparent from a consideration of the drawings and ensuing description.

DESCRIPTION OF THE DRAWINGS

The invention is described in more detail in the following description in conjunction with the appended drawings, wherein.

DETAILED DESCRIPTION OF A PREFERRED EMBODIMENT OF THE INVENTION

Figure 1:
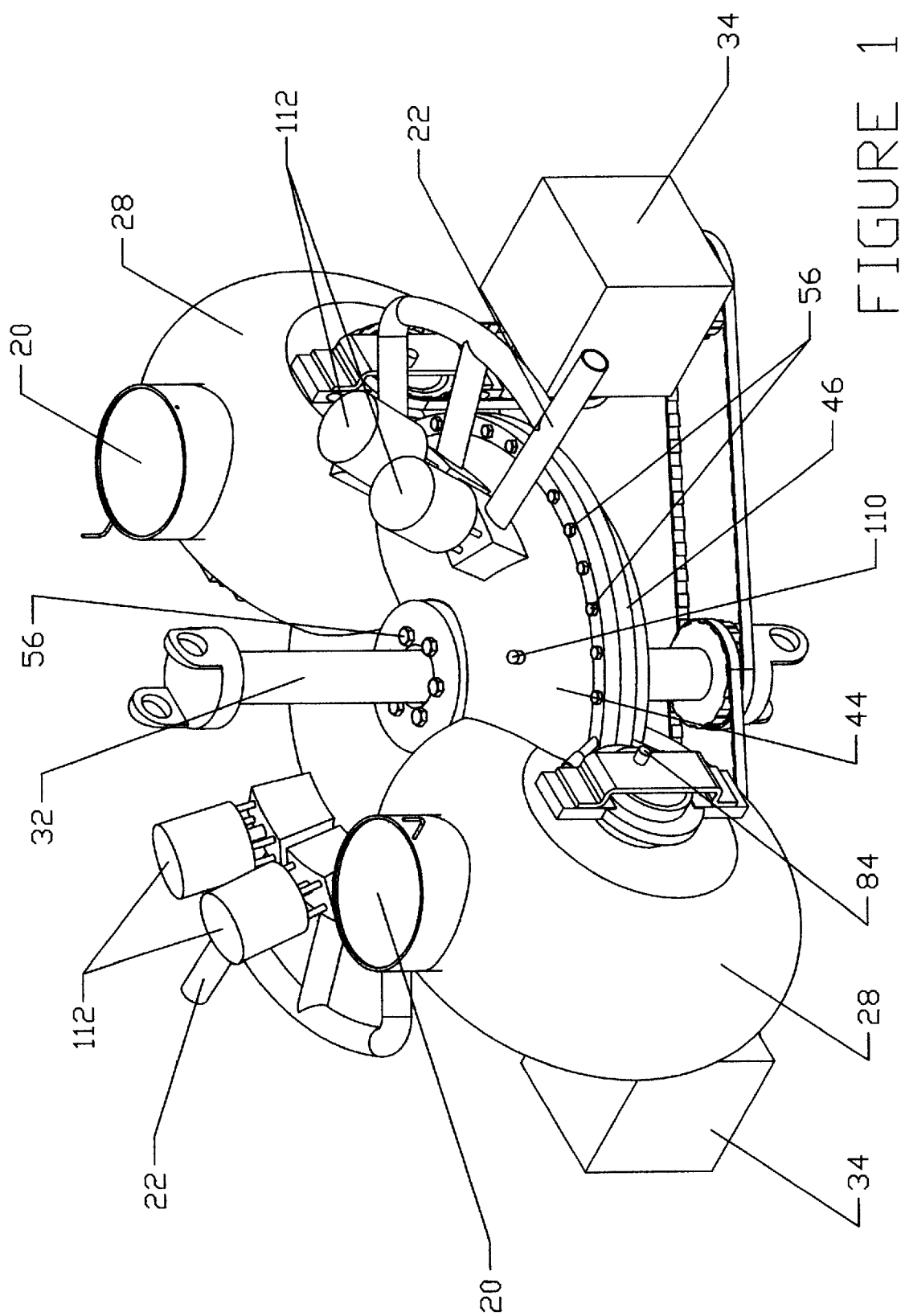
FIG. 1—Overall

FIG. 1 shows a view of the overall Engine. The motor shaft 32 rotates around the power piston housing upper 44 and the power piston housing lower 46 to provide power to an external device. The housings will be kept stationary. The air intake valve 20 is on top of the compression piston housing 28. The exhaust valve operators 112 are on top of the power piston housing upper 44 and open ports to allow the exhaust gases to exit. An exhaust pressure sensor 110 is positioned in the upper housing. An external synchronization means 34 shows as a set of timing belts and an angle gearbox. This keeps the power system synchronized with the compression system. The exhaust 22 is shown as a pipe coming from the exhaust port and the various exhaust valves.

Figure 2:
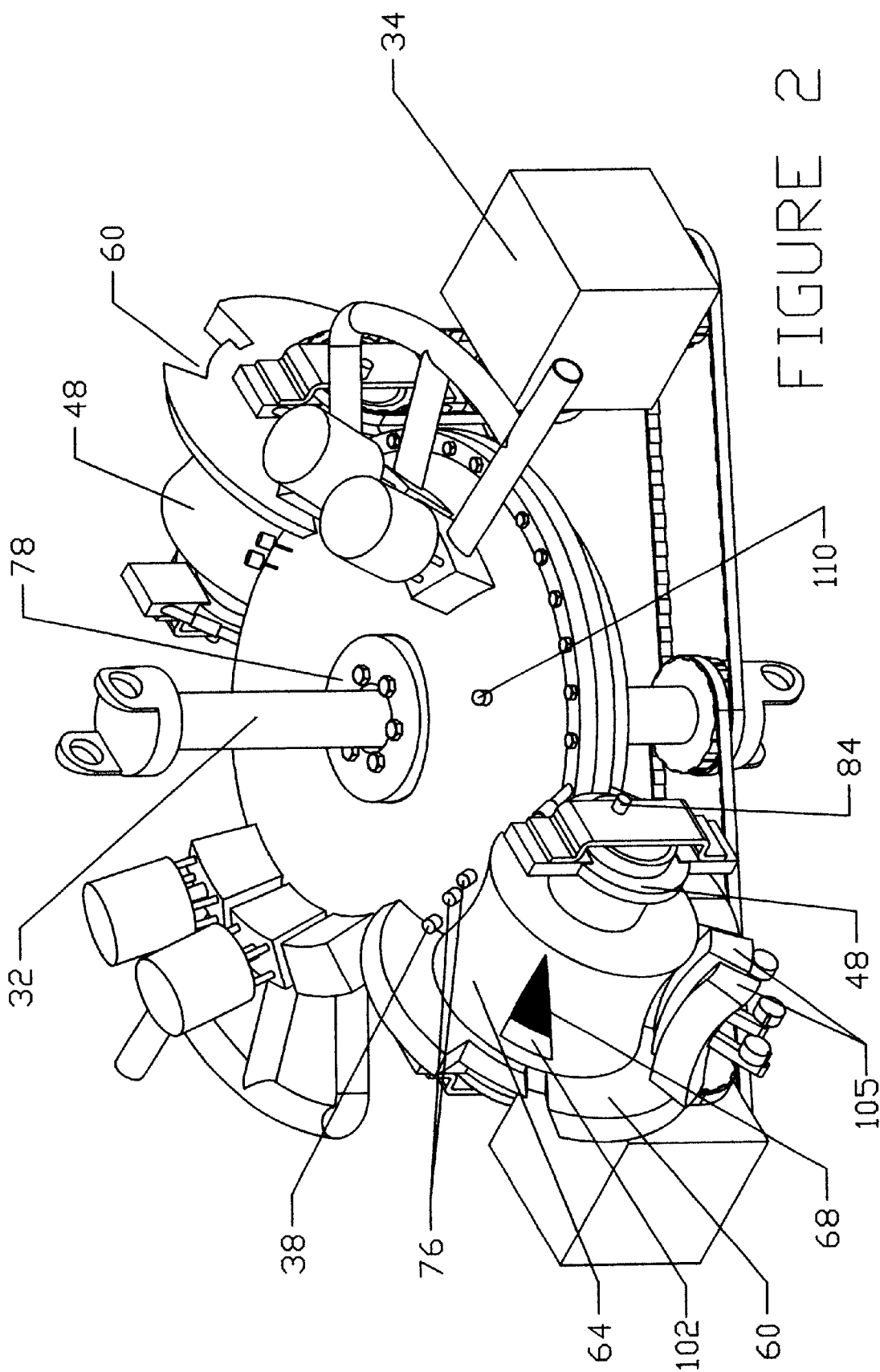
FIG. 2—Overall with the Compression Piston Housings Removed

FIG. 2 shows the same engine with the compression piston housings 28 removed. Compression pistons 68 rotate in compression piston chambers 102 in the compression piston rotor 64. The compression pistons 68 are attached to and rotate around a compression piston shaft 84. The compression piston rotor 64 rotates in a compression rotor bearing 48. The center of the compression piston rotor 64 and the center of the compression piston shaft 84 are not the same. The external synchronization means 34 assures synchronization of the abutment disc 60 and the flywheel 30. An option is to put gear teeth on the abutment disc 60 including the slot for the power piston 42. These gear teeth along with gear teeth on the flywheel 30 and power piston would complete the internal synchronization means 36 (not shown in this view). The preferred embodiment shows two abutment discs 60 and has two power pistons 42 (not shown in this view). The compression piston housing, the abutment disc, the compression piston rotor, the compression piston shaft and the compression piston define a compression producing unit. A plurality of compression producing units can be added to the present invention.

Figure 3:
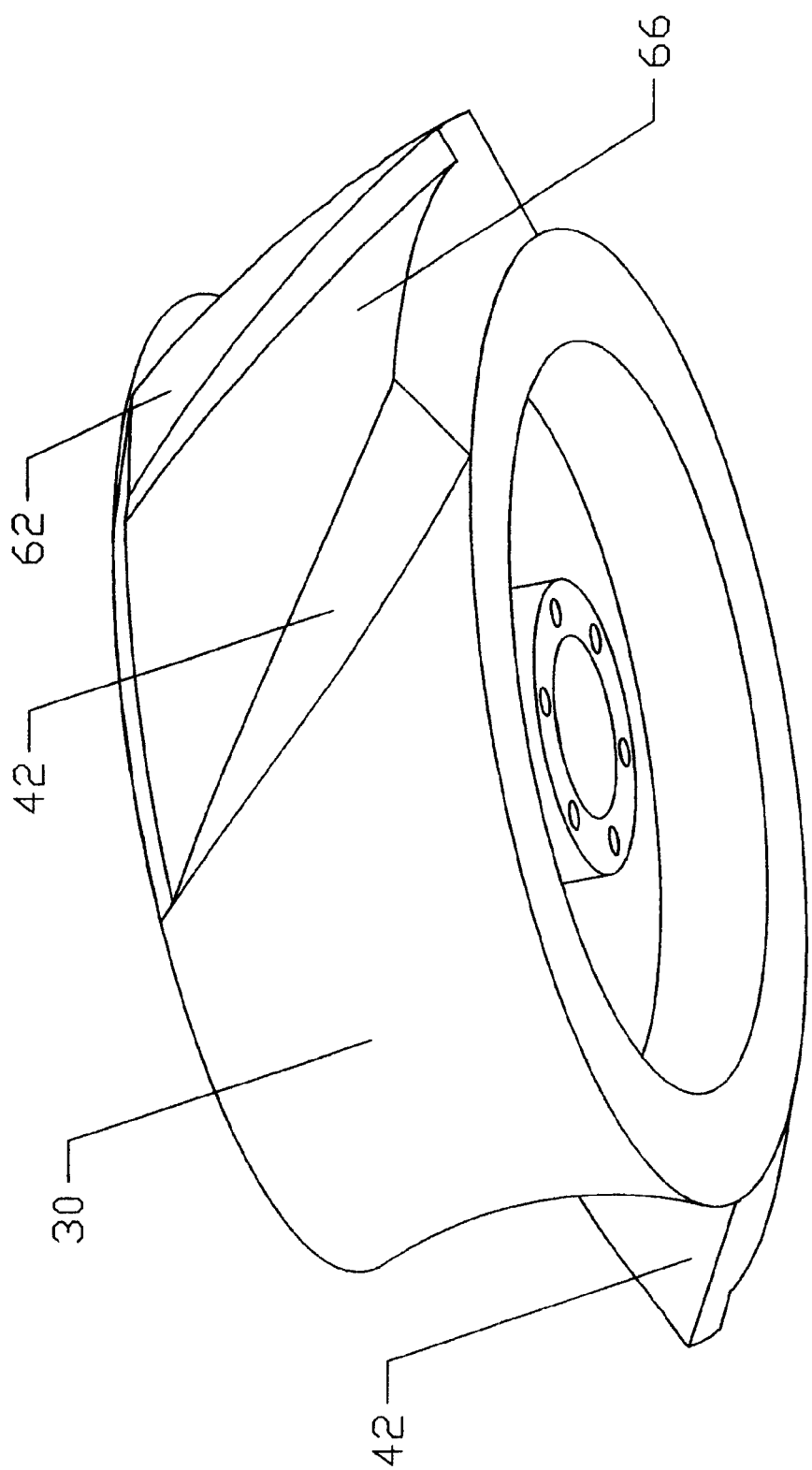
FIG. 3—Power Piston and Flywheel

FIG. 3 shows a view of the power piston 42 and flywheel 30. The power piston 42 rotates around in the power piston housing 44 (not shown in this view) and is attached to the power piston flywheel 30. The power piston 42 has a unique shape. All of the power piston's edges are formed by the shape of a slot in a rotating abutment disc 60(not show in this view) that turns synchronously with the power piston 42. The outer radius is concave. In the front of the power piston 42 is a power piston raised leading edge 62 that comes within and tight tolerance with either the power piston housing upper 44, the power piston housing lower 46, the abutment disc 60, or the compression piston rotor 64. The length of the power piston raised leading edge 62 can be varied with different designs to better seal the compressed gases being delivered by the compression piston 68 (not shown in this view). The distance from the back of the power piston leading edge 62 to the mid-point of the power piston 42 is the power piston top for compressed gases 66 (see FIGS. 7A & 7B). This structure allows a space for the compressed gases to collect at the same rate that the gases are delivered from the compression piston 68 (not shown in this view). Gear teeth on the power piston 42 and flywheel 30 can be added to form part of the internal synchronization means and also help seal the combusting gases. The flywheel and power piston combination could look like a gear of a worm gear with some of the teeth at a larger radius.

Figure 4A:
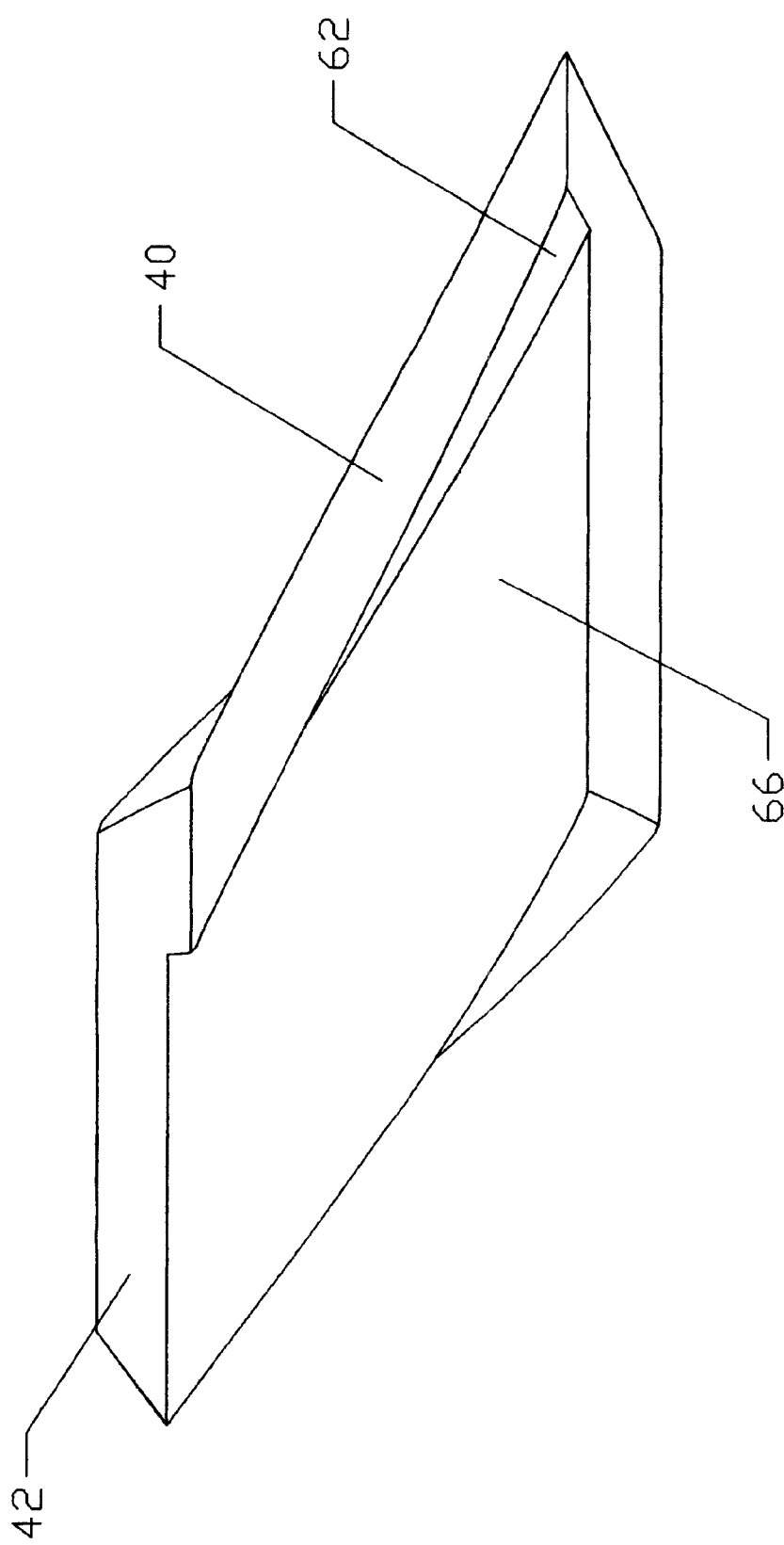
FIG. 4A—Power Piston
Figure 4B:
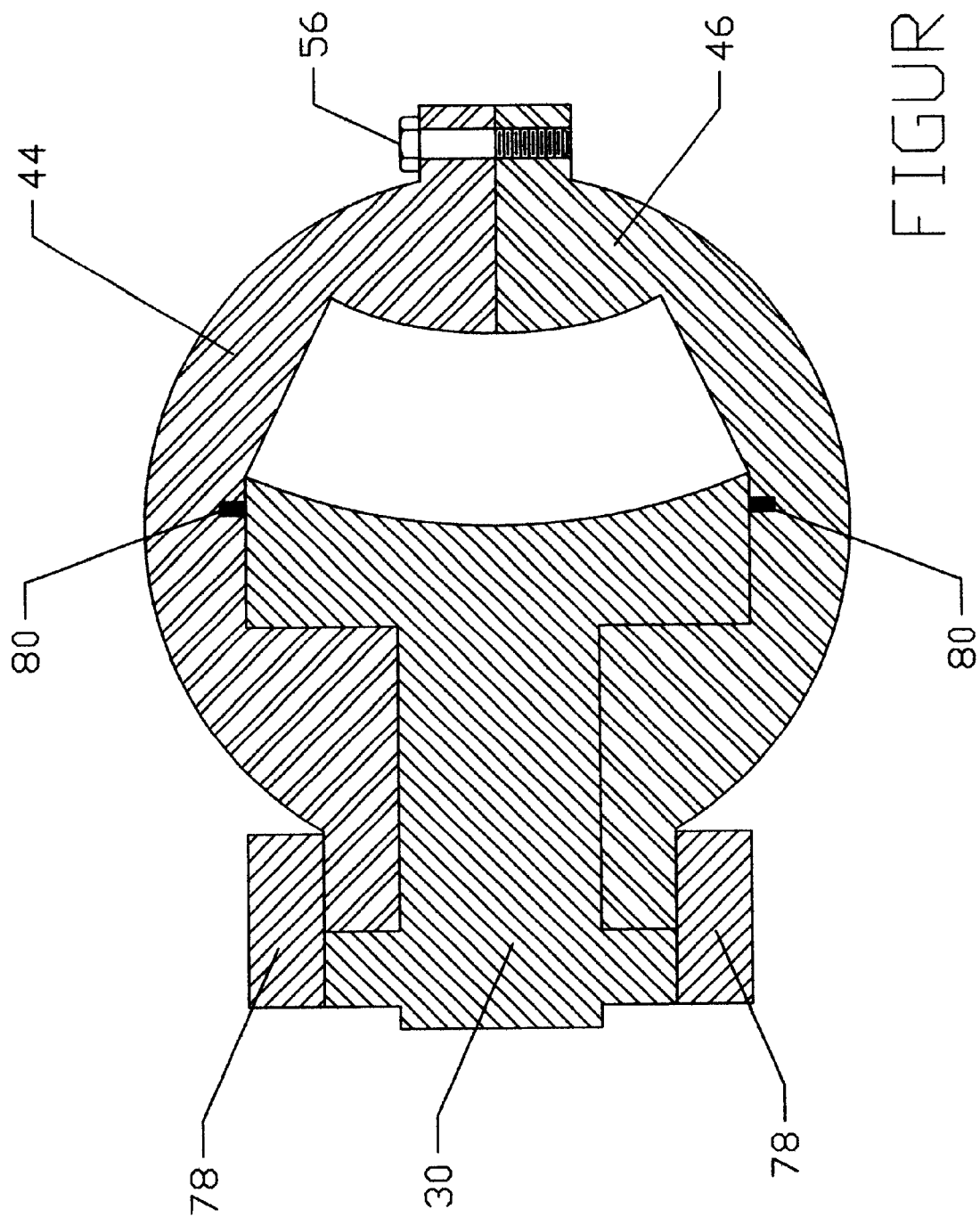
FIG. 4B—Power Piston Housings and Flywheel Cross Section

FIG. 4A shows the view of the power piston 42. FIG. 4B shows the power piston housings and flywheel. The power piston raised leading edge 62 has a place for a power piston leading seal location 40 if one is desired. The power piston housing consists of a power piston housing upper 44 and a power piston housing lower 46. Bolts 56 hold the outer edges together. Cooling is not shown at this time. The engine may be made of ceramic components and not require conventional cooling. Or conventional cooling may be use. The forces pushing the power piston housing upper 44 apart from power piston housing lower 46 are counter acted on the inside diameter by the thrust plates 78. The thrust plates must be lubricated or made of solid lubricant and all the sliding parts must be lubricated or made out of solid lubricant. Oil holes are not shown. The power piston flywheel 30 is heavy enough to react with the side thrust caused by the angle of the trailing edge of the power piston 42. Power piston flywheel ring seals 80 seal the pressure from leaking out through gaps between the flywheel and power piston housings. Not all seals are shown. Bolts 56 hold the outer edges of the housing together.

Figure 5:
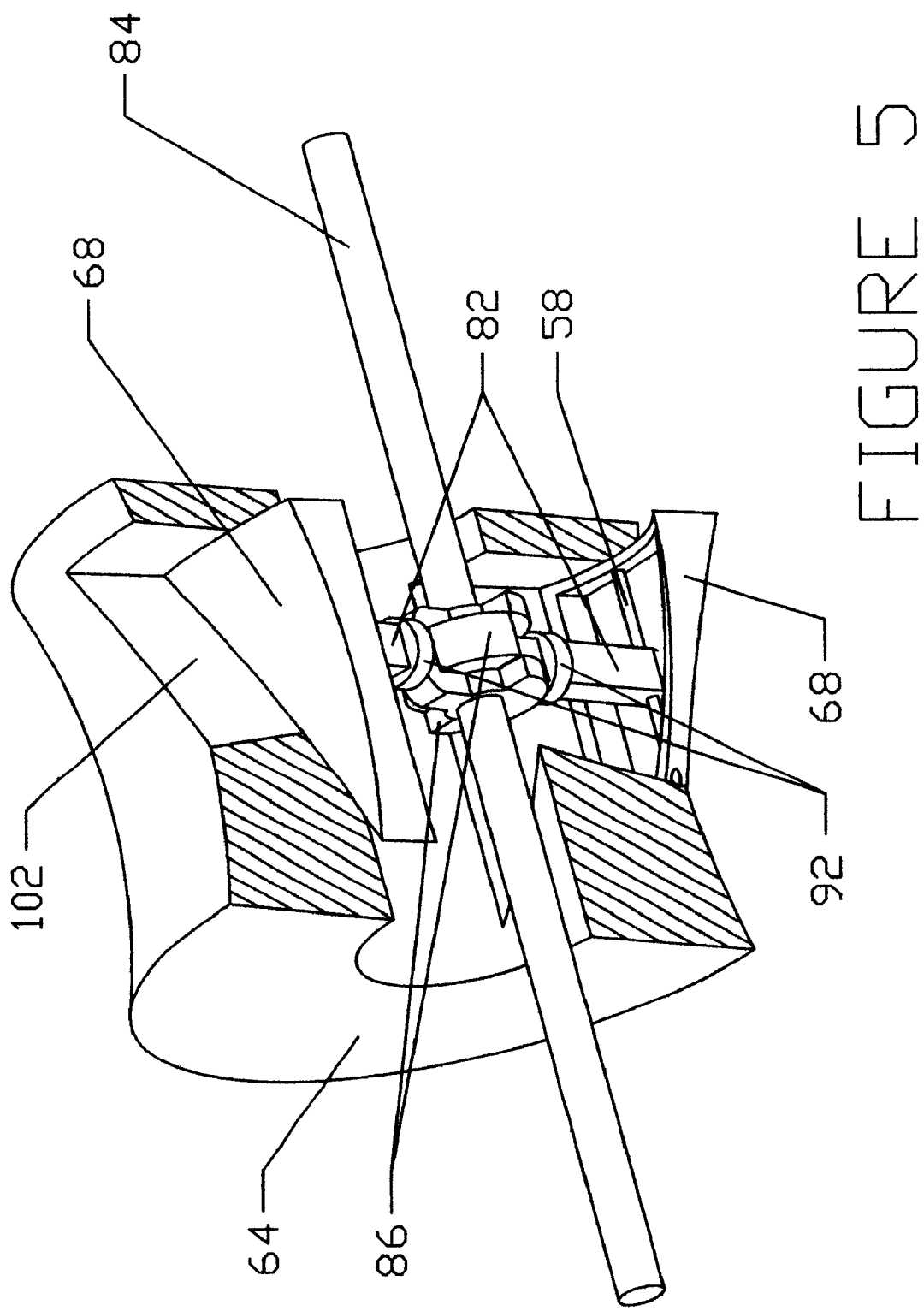
FIG. 5—Compression Piston View with Compression Piston Rotor Cut Away

FIG. 5 shows a view of the compression pistons 68 in the compression piston rotor 64. The compression piston rotor has been sliced to see inside. The compression pistons 68 may have compression piston seals (not shown here) to prevent blow-by. The compression pistons 68 are shaped to deliver a charge of compressed gas to the power piston top for compressed gases 66 behind the power piston raised leading edge 62 and then to wipe on the exhaust seal 90 (see FIGS. 7A & B and FIGS. 8A & B). The shape is triangular and has a radius outer surface to conform to the shape of the power piston 42. The preferred embodiment has the compression piston 68 aligned such with the outer edge of the compression piston rotor 64 so it will be at the same level as the outer edge of the compression piston rotor 64 when the compression piston 68 passes over the exhaust seal. (See FIGS. 8A and B). The compression piston is attached with a compression piston wrist pin 58 to a compression piston rod 82 to a compression piston shaft 84. The centerline of the compression piston shaft 84 and the compression piston rotor are not the same. Thus the compression piston 68 travels from the innermost position of the compression piston rotor 64 to the outermost position as they rotate. The compression piston chamber 102 thus has the compression piston 68 sliding up and down inside even while both the compression piston rotor 64 and the compression pistons 68 both have only circular motion. Compression rod and piston balance weight 86 are shown to help balance the engine. Compression piston rod lengthening or shortening means 92 are shown that can be a heating coil.

Figure 6:
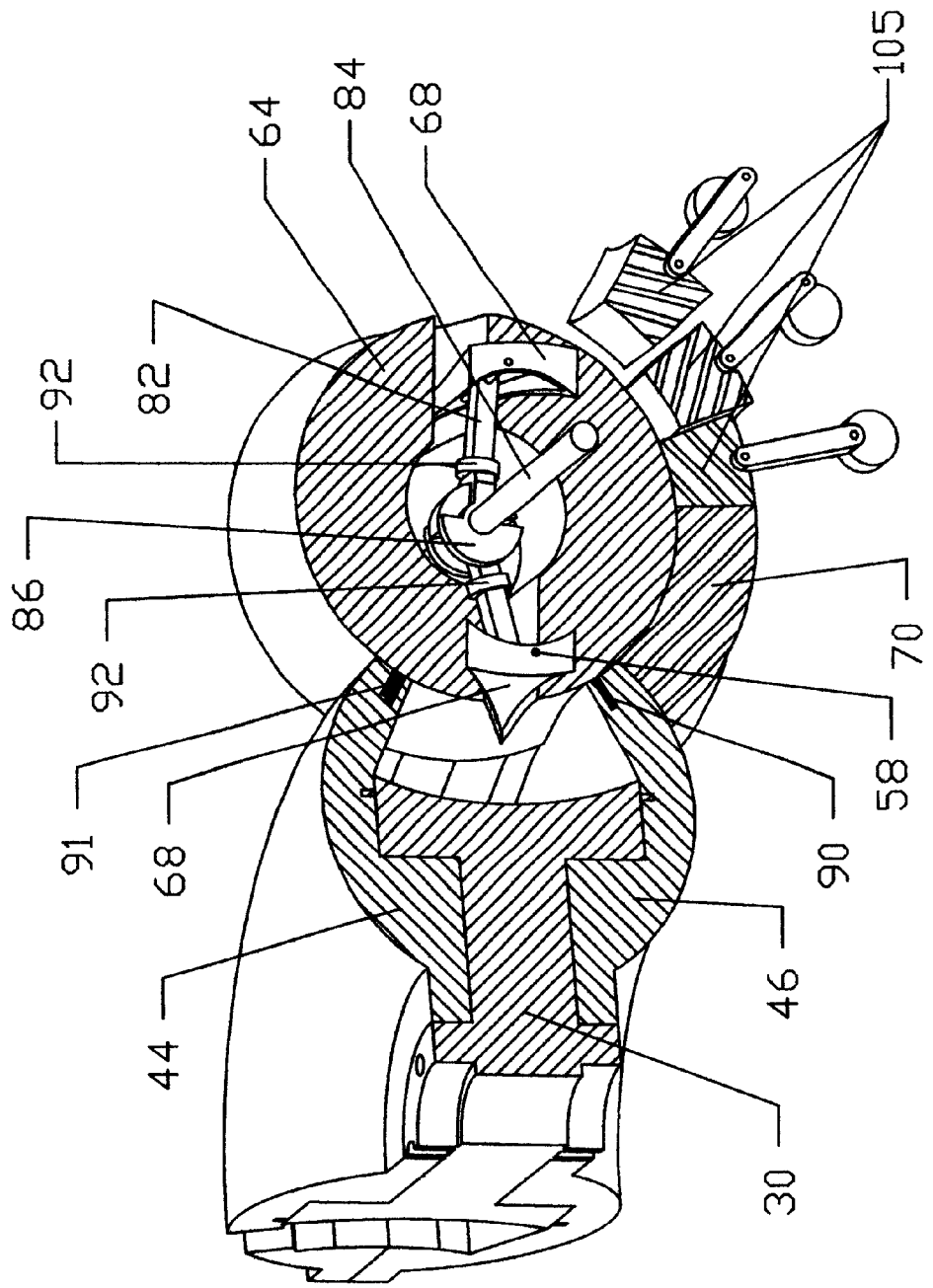
FIG. 6—Compression Piston Assembly & Alignment with Power Piston Housing and the Power Piston removed FIG. 7A—Compressed Volume Transfer & Alignment with Power Piston—Start FIG. 7B—Compressed Volume Transfer & Alignment with Power Piston—Ending FIG. 8A—Exhaust Seal Wiping—Start FIG. 8B—Exhaust Seal Wiping—Ending FIG. 9A—Exploded View of Power Producing Unit FIG. 9B—Exploded View of Compression Producing Unit

FIG. 6 shows more of an elevation view of the compression pistons 68 and associated parts. The power piston 42 has been removed so the relation of the components can be better seen. The compression pistons 68 are attached to a compression piston wrist pin 58 that is attached to a compression piston rod 82 that is attached to a compression piston shaft 84. Each rod will have a compression rod and piston balance weight 86 opposite the end with the compression piston 68. The compression piston 68 will be accelerating and decelerating in relation to the compression piston rotor 64 with each revolution. A constant center of gravity for the compression piston 68, compression piston wrist pin 58, compression piston rod lengthening or shortening means 92, compression piston rod 82, and compression rod and piston balance weight 86 will provide a smoother running engine. The combination of retractable compression stators 105 and compression piston stator 70 starts where the compression piston 68 is recessed the most in the compression piston rotor 64 and extends axially to attach to the power piston housing lower 46. The retractable compression stators 105 can delay sealing of the compressed air—thus causing a variable compression ratio. The compression piston 68 can be seen on the right side of the FIG. 6 to be recessed from the outer edge of the compression piston rotor 64 in the compression piston chamber 102. It is nearly extended to the outer surface of the compression piston rotor 64 when it is to the left—over the power piston 42 (not shown in this view).

Figure 7B:
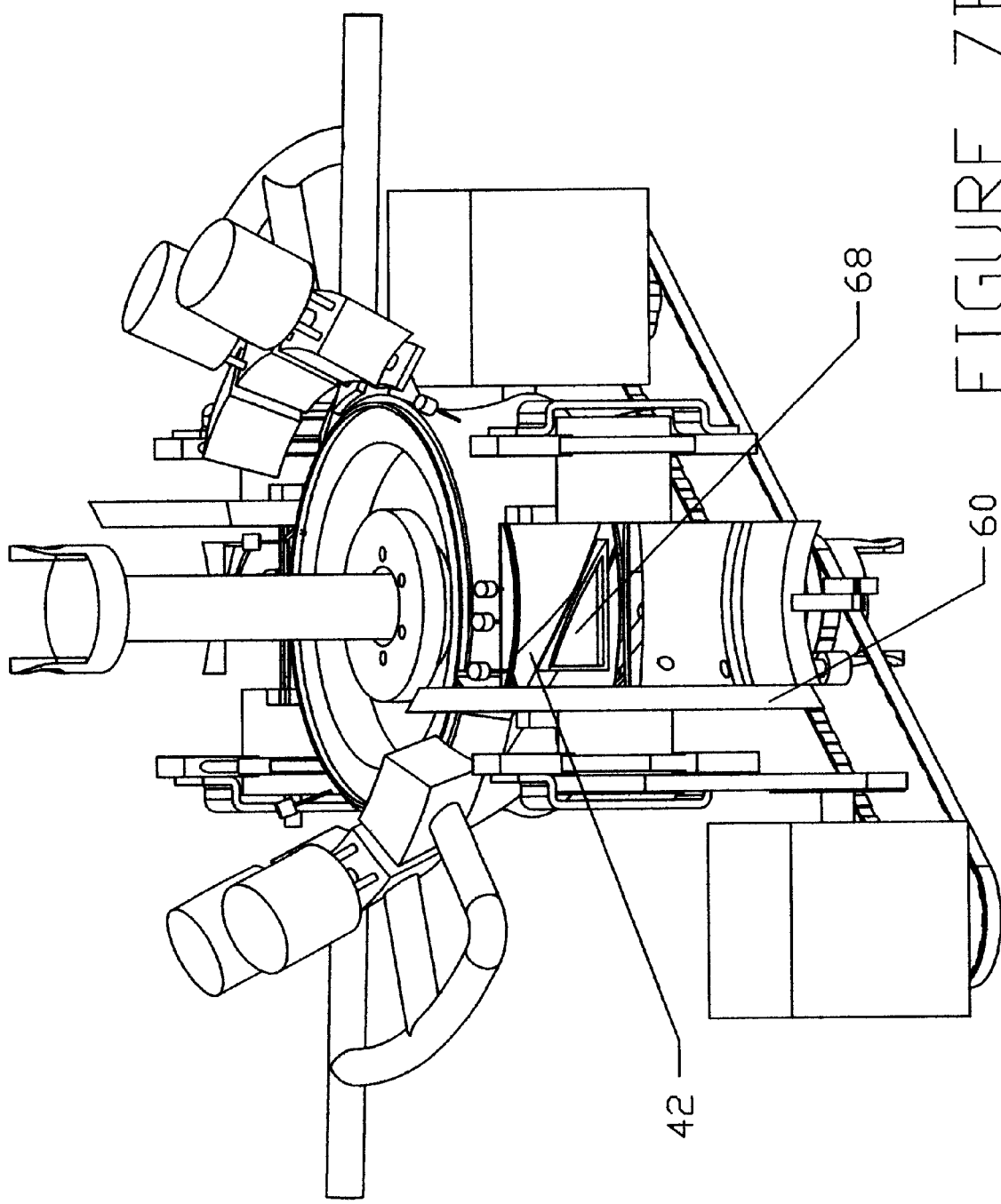

FIGS. 7A and 7B show the alignment of the compression piston 68 with the power piston 42. At the start (see FIG. 7A) the power piston 42 is just starting through the gap in the abutment disc 60. The compression piston 68 is still compressing and starting to put the compressed volume on the power piston top for compressed gases 66. The depth of the top of the power piston is designed to receive gases from the compression piston 68 at approximately the same rate that the compression piston 68 is emptying the compression piston chamber 102. FIG. 7B shows the transfer just finishing. By the time of the transfer finish, the combustion should be started. The combusted gases push first on the power piston raised leading edge 62. Then when the power piston 42 is halfway through the abutment disc 60 the gases start to push on the rest of the backside of the power piston 42.

Figure 8A:
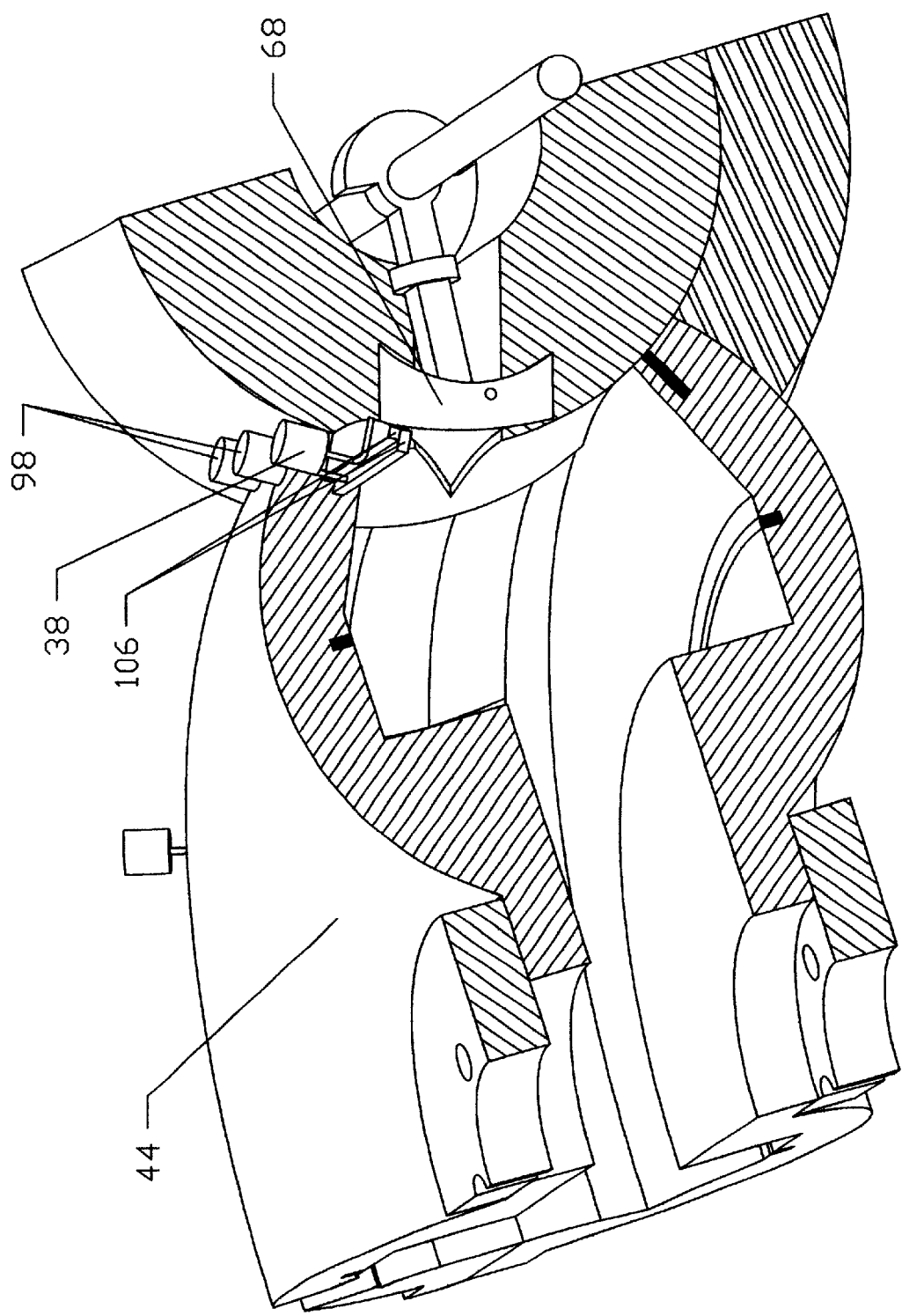
Figure 8B:
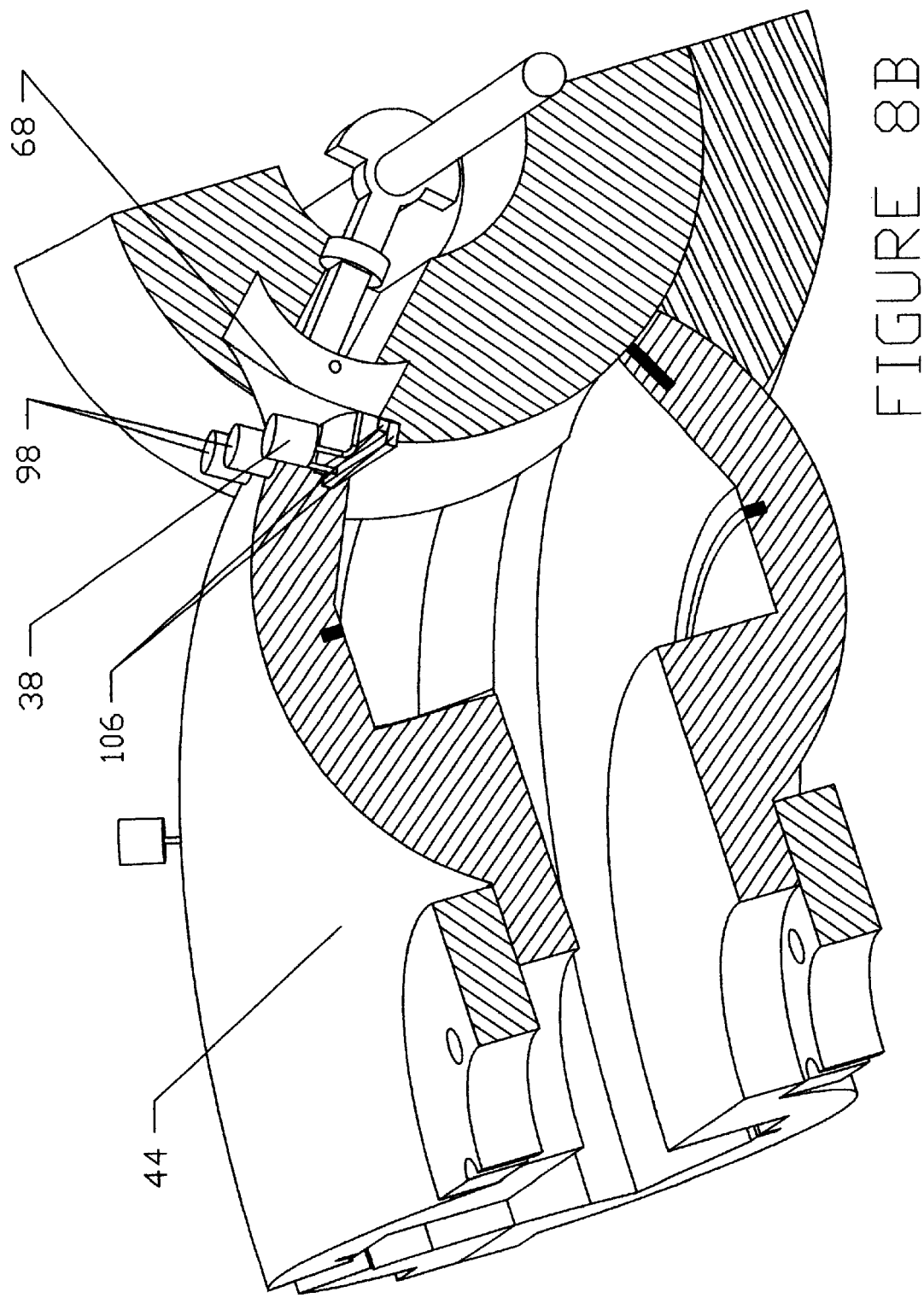

FIGS. 8A and 8B show the exhaust seal wiping. The necessary adjustments are made that allows for the outside tip of the compression piston 68 to be near the outside tip of the compression piston rotor 64 as it passes over one of the retractable exhaust seals 106. Soon after the compression piston 68 leaves the power piston 42 one of the exhaust seals 106 must wipe the face of the compression piston 68 at the same time as it wipes the tip of the compression piston rotor 64. Variations in the exhaust seal design can help provide an acceptable amount of exhaust blow by (exhaust gas recirculation). Sealing the compression piston 68 as it leaves the combustion zone relies on a critical location of the retractable exhaust seals 106 with relation to the compression piston 68. The preferred embodiment has two exhaust seals but a single or adjustable exhaust seal may be used. Retractable exhaust seals 106 will be extended or retracted based on movement as sensed by an exhaust seal movement detector 98 on each exhaust seal. As the compression piston rod 82 expands and contracts, the correct seal will be put in service. Additionally the compression rod lengthening or shortening means 92 can be used to adjust the rod length. These can be adjusted from feed back of a distance-measuring device 38 to measure the distance that the compression piston 68 is away from the outside tip of the compression piston rotor 64.

Figure 9A:
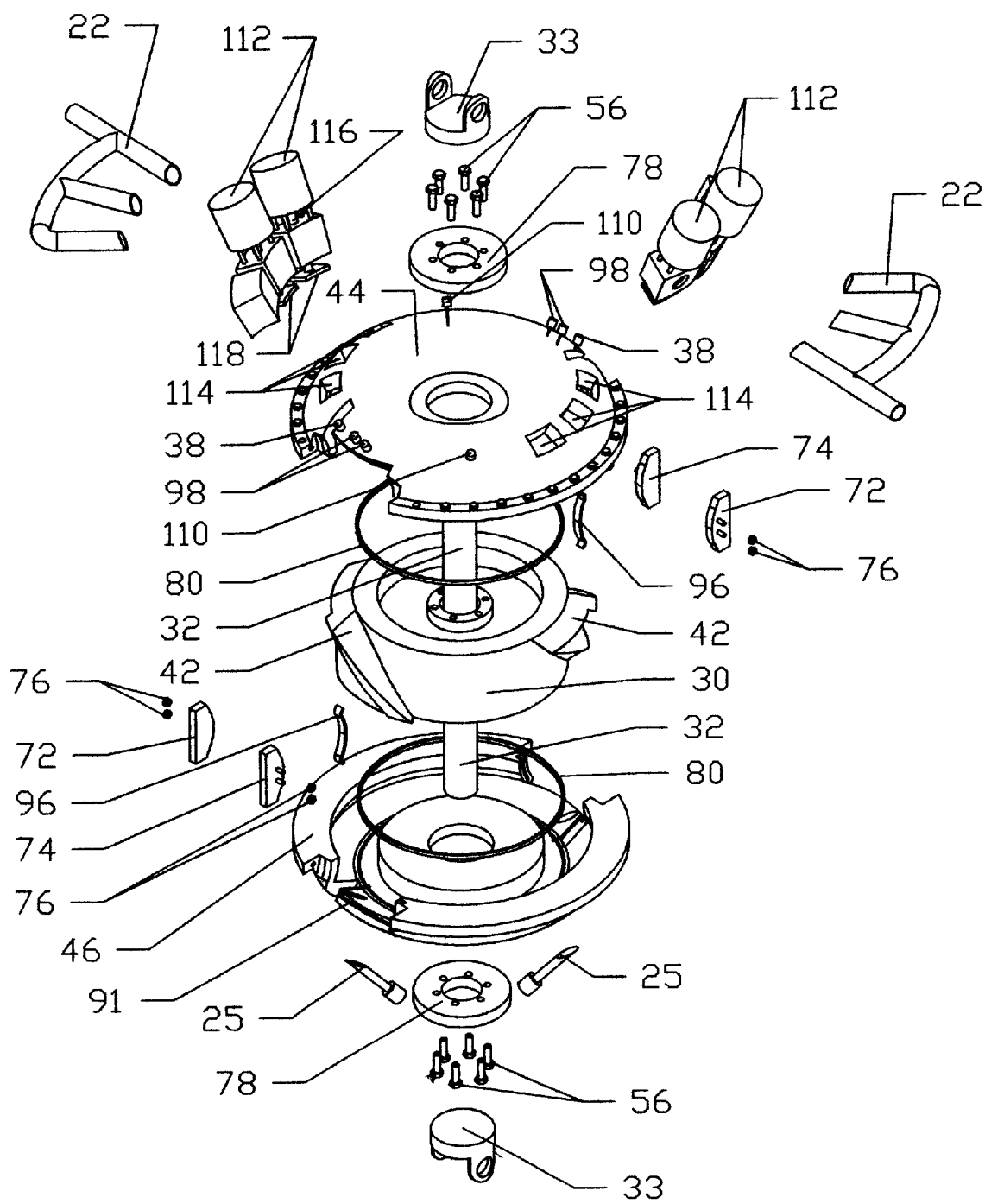
Figure 9B:
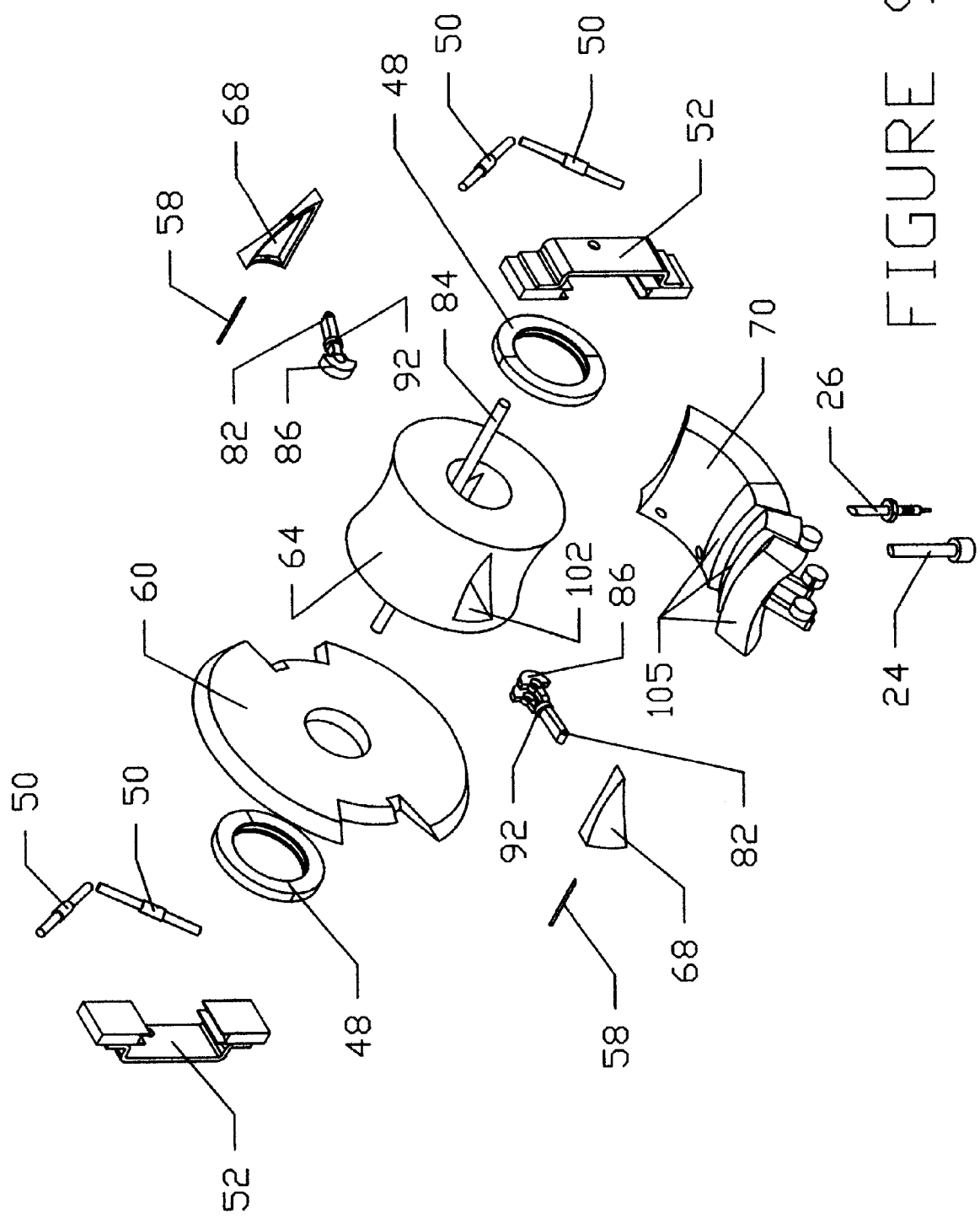

FIGS. 9A and 9B show exploded views of the engine. The fuel injector for gasoline 24 and fuel igniter 26 (see FIG. 9B) are present to inject the fuel and ignite the mixture at the correct time. For high-speed operation the location of these devices can be moved farther back on the compression piston stator 70. Additionally, the igniter can be eliminated if compression ignition is operational and fuel injector for diesel 25 can used (see FIG. 9A). FIG. 9A also shows the following parts not yet discussed: the motor shaft end trunion 33, the abutment disc engagement means during acceleration 72, the rotor engagement means during deceleration 74, engagement means adjusting nuts 76, rotor combustion seals 96, exhaust ports 114, exhaust valve stems 116, and exhaust valve plugs 118. FIG. 9B shows the compression piston rotor adjustment means 50 and the compression piston rotor & shaft bracket 52 not yet discussed.

Air enters an air intake valve 20 and enters the compression piston housing 28 that surrounds the compression piston rotors 64. The rotation of the compression piston rotor 64 with the compression pistons 68 inside with an off set center of rotation causes the air to fill the compression piston chamber 102 as the compression piston 68 travels from the maximum to the minimum radius of the compression piston rotor 64. Once the compression piston chamber 102 is filled with air, the compression piston rotor 64 is sealed by retractable compression stators 105 or compression piston stator 70. The retractable compression stators 105 allow the compression ratio to be adjusted by not sealing the compression chamber 102 while the compression piston starts to move outward toward the tip of the compression piston rotor 64. An engine can be designed with a very high compression ratio and then the retractable compression stator 105 or seals can be retracted to run with a lower compression ratio. The number of retractable compression stators may vary.

When the compression piston 68 has nearly compressed the gas as desired, the compression piston begins to travel over the top of the power piston 42. The design of the top of the power piston 42 has a raise leading edge and a calibrated depression on its top to receive the gases from the compression piston 68 at about the same rate as the compression piston 68 is delivering the gases. This is the power piston top for compressed gases 66. The compression piston 68 has a shape to fit closely through the slot on the abutment disc 60. The compression piston 68 transfers the air to the combustion zone on top of the power piston 42 with fuel being injected appropriately and sparked appropriately to begin combustion. Conventional gasoline engines will have the gasoline premixed with the air and be sparked to begin ignition. A diesel engine will have the fuel injected after compression has achieved an auto ignition. Temperatures of the fuel and does not need to be externally ignited. Gasoline can be injected after auto ignition temperature are achieved to allow a leaner combustion operation and to eliminate the spark plug. The turning angle of the power piston flywheel 30 during this process can be adjusted by varying the design width and height of the power piston 42 and compression piston 68.

As the compression piston 68 exits the combustion zone from over the top of the power piston 42, the compression piston's outer edge is about the same distance as the compression piston rotor's 64 outer edge from the center of the compression piston rotor 64 center. The retractable exhaust seals 106 prevents excess combustion gases from leaving the combustion chamber. Sealing the compression piston 68 as it leaves the combustion chamber relies on a critical location of the retractable exhaust seals 106 with relation to the compression piston 68. Retractable exhaust seals 106 extend or retract based on movement as detected by the distance measuring means 38 (see FIG. 8A or B). If the Compression piston rod 82 expands and contracts too much for one seal, the other seal can be put in service. Some exhaust gas recirculation may be desirable. Currently automobile engines recirculate 10 to 20 percent recycle gas in the air charge in order to lower nitrous oxide emissions.

As the compression piston 68 continues rotation it picks up another volume of air in the compression piston chamber 102 as it moves from the outside edge to the inside of the compression piston rotor 64.

The flywheel 30 with the power piston 42 and the abutment disc 60 are synchronized. The current configuration shows only an external synchronization means 34. Internal gearing provides an internal synchronization means and also provides a seal where the abutment disc 60 meets the power piston 43 and the flywheel 30. Gear teeth may be put on the top of the power piston 42 to provide continuity of the internal synchronization means 36. The abutment disc 60 is attached to the compression piston rotor 64 to keep it synchronized as well. The abutment disc 60 allows the power piston 42 to pass through as it rotates. When the power piston 42 first comes to the abutment disc 60 the sealing is not important since any exhaust can be exchanged from one side of the abutment disc 60 to the other. As the power piston 42 passes through the abutment disc 60, the abutment disc 60 begins to mate with the top and to wipe the trailing edge of the power piston raised leading edge 62. This is really what sets the shape of the trailing edges of the power piston 42. The abutment disc 60 wipes the trailing edge of the power piston raised leading edge 62 at the same time as the compression piston 68 places fresh compressed gas on the power piston top for compressed gases 66 which is the first half of the power piston 42 behind the power piston raised leading edge 62.

Fuel is injected or ignited as appropriate to have the fuel ready for combustion with the compressed gases at about the time the power piston 42 is half way through the abutment disc 60. The combusted gas first acts only on the power piston raised leading edge 62 to propel the power piston 42 around in the power piston housings. Then as the abutment disc 60 allows the gas to get behind the entire back side of the power piston 42, the combustion gas propels the power piston 42 by it's entire cross sectional area. There are side thrust forces that are handled by the power piston flywheel 30 and the power piston 42, the power piston housing upper 44, and the power piston housing lower 46. The reaction force of the power piston 42 going forward is handled by the abutment disc 60 at the abutment disc engagement means during acceleration 72. When the power piston 42 is decelerating, the reaction force is handled by the compression piston rotor 64 and the rotor engagement means during deceleration 74.

As the power piston 42 is moving around the housing from the combustion gases on it's backside, the front side of the power piston 42 is pushing exhaust gases out the exhaust 22. These exhaust gases are trapped between the front side of the power piston raised leading edge 62 and next abutment disc 60. During partial power, exhaust ports 114 are opened by exhaust valve operators 112 to relieve the exhaust sooner to prevent a vacuum from forming behind the power piston 42.

When the power piston 42 gets to the next abutment disc 60 the cycle begins again.

Another way to describe the engine's operation is to say that the four cycle (intake, compression, power expansion, and exhaust all occur from the time the power piston 42 and the synchronized compression piston rotor 64 make on half of a revolution in the preferred embodiment. We will start with the power piston 42 being half way through the abutment disc 60. This is when the explosive pressure of combustible gases is near the maximum. The explosive pressure pushes the power piston 42 around to the next abutment disc 60. In front of the power piston 42 the gases from the previous expansion cycle are driven out of the engine through the exhaust 22. Also during this half of a revolution the compression piston 68 that travels away from the power piston 42 that just deposited the combustion gases now picks up a fresh charge of air. The compression piston that is rotating toward the power piston 42 is compressing a charge of air and perhaps gasoline fuel. Diesel fuel will probably be injected after compression. When the power piston 42 is again half way through the abutment disc 60 another explosion occurs and the cycle starts again. If more power pistons 42 and abutment discs 60 etc are added, we see that all the four cycles occur during the time a power piston 42 travels between abutment discs 60.

Sealing is more critical at low rpm. Close tolerances without seals can be use at higher rpm.

Thus the reader will see that this invention is a truly rotary engine with advantages of:
1. Variable Stroke
2. Variable Compression
3. High Torque
4. High Efficiency
5. Low Internal Friction
6. An Adiabatic Engine Design While my above description contains many specifics, these should not be construed as limitations of the scope of the invention, but rather as an exemplification of one preferred embodiment thereof. Many other variations are possible. For example future modifications may provide for easy adjustment of the abutment disc 60 in relation to the compression piston rotor 64 to change the timing of the compressed air exchange. The alignment of the compression piston rotor 64 could be adjusted as the uneven heating and expansion of parts occurs. Balancing weights could be attached to the flywheel and be automatically adjusted with feed back from vibration sensor on the engine to provide a smoother running engine. Automatic adjustment of the abutment disc engagement means during acceleration 72 and the rotor engagement means during deceleration 74 can be implemented to account for wear on these surfaces. An adjustable seal whose location can be made to be at the best location to seal the compression piston rotor 64 and compression piston 68 can replace the retractable exhaust seals 106. Seals can be put on the front of the power piston 42. The power piston can be made segmented so it can better seal against the housing.

Accordingly, the scope of the invention should be determined not by the embodiments illustrated, but by the appended claims and their legal equivalents.

I claim:
1. A rotary internal combustion engine comprising:
a generally circular housing;
a flywheel rotatably mounted in said circular housing, said flywheel having at least one radially raised projection extending therefrom to define a power piston;

at least one abutment disc, said abutment disc defining an opening configured and dimensioned to permit said power piston to rotatably pass therethrough, wherein said flywheel and said abutment disc are driven in a synchronous relation;

at least one compression piston rotor having a central axis and connected to said abutment disc so as to rotate synchronously therewith, said compression piston rotor defining at least one internal cavity;

at least one compression piston shaft arranged axially offset from said central axis of said compression piston rotor;

a covering means for covering said compression piston rotor, said covering means configured to cooperate with said compression piston to compress gases disposed in said internal cavity as said compression piston rotor rotates; and at least one compression piston positioned within said compression piston rotor, said compression piston rotatably secured to said compression piston shaft such that said compression piston rotates eccentrically to the central axis of the compression piston rotor;

wherein said abutment disc, said covering means, said compression piston rotor, said compression piston shaft and said compression piston define a compression producing unit;

wherein said radially raised projection of said power piston is dimensioned and configured to communicate with said compression piston as said compression piston rotor rotates;

wherein said compression piston defines within said internal cavity of said compression rotor a variable chamber varying in volume as said compression piston rotor rotates.

2. The rotary internal combustion engine according to claim 1 wherein said compression unit includes two compression pistons secured to said compression piston shaft in a generally diametrical relationship, said compression piston rotor having two internal cavities, each of said internal cavities accommodating one of said compression pistons, said flywheel having two power pistons, each power piston accommodating a corresponding one of said compression pistons.

3. The rotary internal combustion engine according to claim 2 comprising two compression units arranged opposite to one another along the periphery of said circular housing and cooperating with said power pistons.

4. The rotary internal combustion engine according to claim 2 comprising four compression units equally spaced along the periphery of said circular housing and cooperating with said power piston.

5. The rotary internal combustion engine according to claim 2 comprising a plurality of compression units equally spaced along the periphery of said circular housing and cooperating with a plurality of said power pistons defined along said flywheel.

6. The rotary internal combustion engine according to claim 1 further comprising an exhaust hole defined along said circular housing and positioned adjacent to said abutment disc opposite to said compression piston rotor.

7. The rotary internal combustion engine according to claim 1 further comprising a fuel introducing device in communication with said variable chamber and positioned along the periphery of said compression piston rotor.

8. The rotary internal combustion engine according to claim 1 further comprising a means for igniting gases in communication with said variable chamber, wherein gases ignited by said igniting means exert pressure to urge rotation of said power piston within said circular housing.

9. The rotary internal combustion engine according to claim 1 wherein said power piston has a peripheral surface having a predetermined shape configured and dimensioned to communicate with said compression piston such that compressed gases are transferred from said compression piston chamber to a varying volume defined by said periphery of said power piston, said abutment disc and said circular housing.

10. The rotary internal combustion engine according to claim 1 wherein said compression piston has a predetermined shape configured and dimensioned to communicate with a peripheral surface of said power piston such that compressed gases are transferred from said variable chamber at a predetermined rate to said peripheral surface of said power piston.

11. The rotary internal combustion engine according to claim 10 wherein said predetermined shape of said compression piston is generally triangular.

12. The rotary internal combustion engine according to claim 1 further comprising a seal mounted along an outer periphery of said compression piston rotor and configured to engage with said compression piston and said compression piston rotor as said piston compression rotor rotatably passes by said seal.

13. The rotary internal combustion engine according to claim 12 wherein said compression piston has a piston head having an outer periphery with a radial curvature, said piston head and the outer periphery of said compression piston rotor having the same radial curvature such that as said compression piston and said compression piston rotor rotatingly approach said seal the piston head is radially aligned with the outer periphery of said compression piston rotor.

14. The rotary internal combustion engine according to claim 1 further comprising an exhaust valve connected to said circular housing.

15. The rotary internal combustion engine according to claim 14 further comprising a pressure sensor device sensing pressure in said circular housing and connected to said exhaust valve to variably adjust expulsion of exhaust gases from said circular housing.

16. The rotary internal combustion engine according to claim 1 further comprising a weight balance device connected to said flywheel and adjustable to maintain a predetermined engine balance.

17. The rotary internal combustion engine according to claim 1 further comprising a slick engagement device positioned between said abutment disc and said circular housing and configured to adjust friction on said abutment disc during acceleration of said rotary engine.

18. The rotary internal combustion engine according to claim 1 further comprising a slick engagement device positioned between said compression piston rotor and said circular housing to adjust friction on said compression piston rotor during deceleration of said rotary engine.

* * * * *